United States Patent
Nakamura

(10) Patent No.: US 7,821,784 B2
(45) Date of Patent: Oct. 26, 2010

(54) ELECTRONIC APPARATUS

(75) Inventor: Kazuhiro Nakamura, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/197,965

(22) Filed: Aug. 25, 2008

(65) Prior Publication Data

US 2009/0103259 A1   Apr. 23, 2009

(30) Foreign Application Priority Data

Oct. 19, 2007 (JP) .............................. 2007-272988

(51) Int. Cl.
*G06F 1/16* (2006.01)

(52) U.S. Cl. ................. 361/679.33; 257/697; 174/51 R; 710/304

(58) Field of Classification Search ............ 361/679.55, 361/679.27, 679.4, 714, 730, 752; 257/99, 257/103, 697; 174/35, 51 R; 248/552; 710/303, 710/304

See application file for complete search history.

(56) References Cited

U.S. PATENT DOCUMENTS

| | | | |
|---|---|---|---|
| 6,014,311 A | 1/2000 | Shin et al. | |
| 6,510,057 B2 * | 1/2003 | Yap et al. | 361/752 |
| 2007/0047197 A1 | 3/2007 | Kobayashi et al. | |
| 2007/0121284 A1 | 5/2007 | Iida et al. | |
| 2009/0021903 A1 * | 1/2009 | Chen et al. | 361/683 |

FOREIGN PATENT DOCUMENTS

| | | |
|---|---|---|
| CN | 1920738 | 2/2007 |
| JP | 59-083226 | 5/1984 |
| JP | 2-138337 | 11/1990 |
| JP | 3-110611 | 5/1991 |
| JP | 4-52715 | 2/1992 |
| JP | 6-35566 | 2/1994 |
| JP | 09-230961 | 9/1997 |
| JP | 9-305261 | 11/1997 |
| JP | 2004-118504 | 4/2004 |
| JP | 2006-252041 | 9/2006 |
| JP | 2007-058580 | 3/2007 |

(Continued)

OTHER PUBLICATIONS

Japanese Patent Application No. 2007-272988, Notice of Reasons For Rejection, mailed Feb. 24, 2009, (English Translation).

(Continued)

*Primary Examiner*—Hung V Duong
(74) *Attorney, Agent, or Firm*—Blakely, Sokoloff, Taylor & Zafman LLP

(57) ABSTRACT

According to one embodiment, an electronic apparatus includes a housing, a battery pack, an ODD unit having a thickness smaller than the battery pack, and an additional device contained in the housing. The battery pack is arranged in a back section of the housing. The ODD unit is arranged to be one-sidedly shifted to a front section in the housing, and includes a front end portion opposed to the front section, and a back end portion opposed to the battery pack. The additional device is away from the front end portion of the ODD unit, and overlaps the back end portion of the ODD unit in the vertical direction.

20 Claims, 8 Drawing Sheets

FOREIGN PATENT DOCUMENTS

| | | |
|---|---|---|
| JP | 2007-115091 | 5/2007 |
| JP | 2007-179151 | 7/2007 |

OTHER PUBLICATIONS

Japanese Patent Application No. 2007-272988, Decision of Rejection, mailed May 26, 2009, (English translation).

Chinese Patent Application No. 200810211106.0, The First Office Action, mailed Jun. 10, 2010 (English translation).

Japanese Patent Application No. 2009-195874, Notice of Reasons for Rejection, mailed Jul. 6, 2010, (English Translation).

* cited by examiner

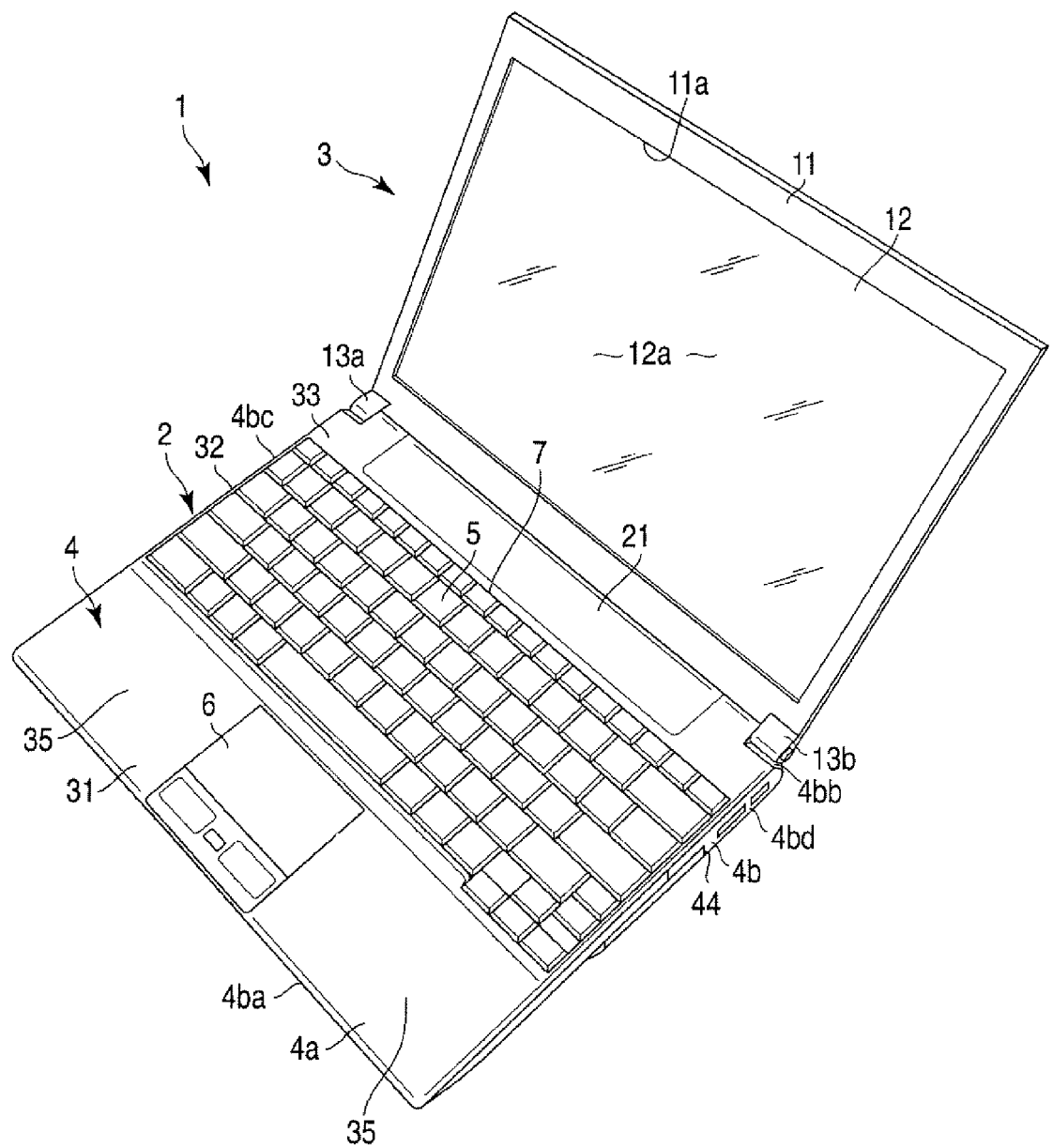
F I G. 1

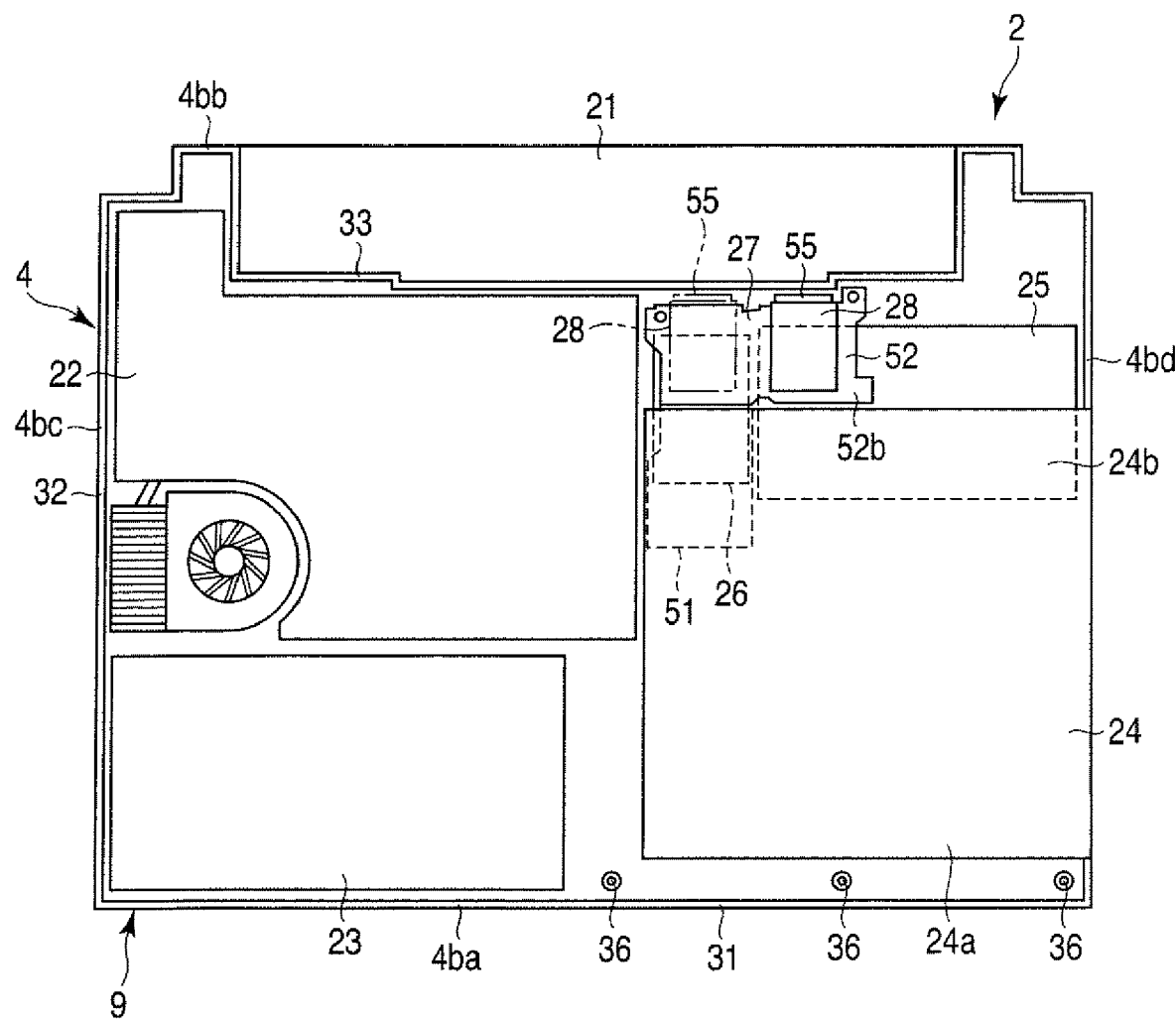
F I G. 2

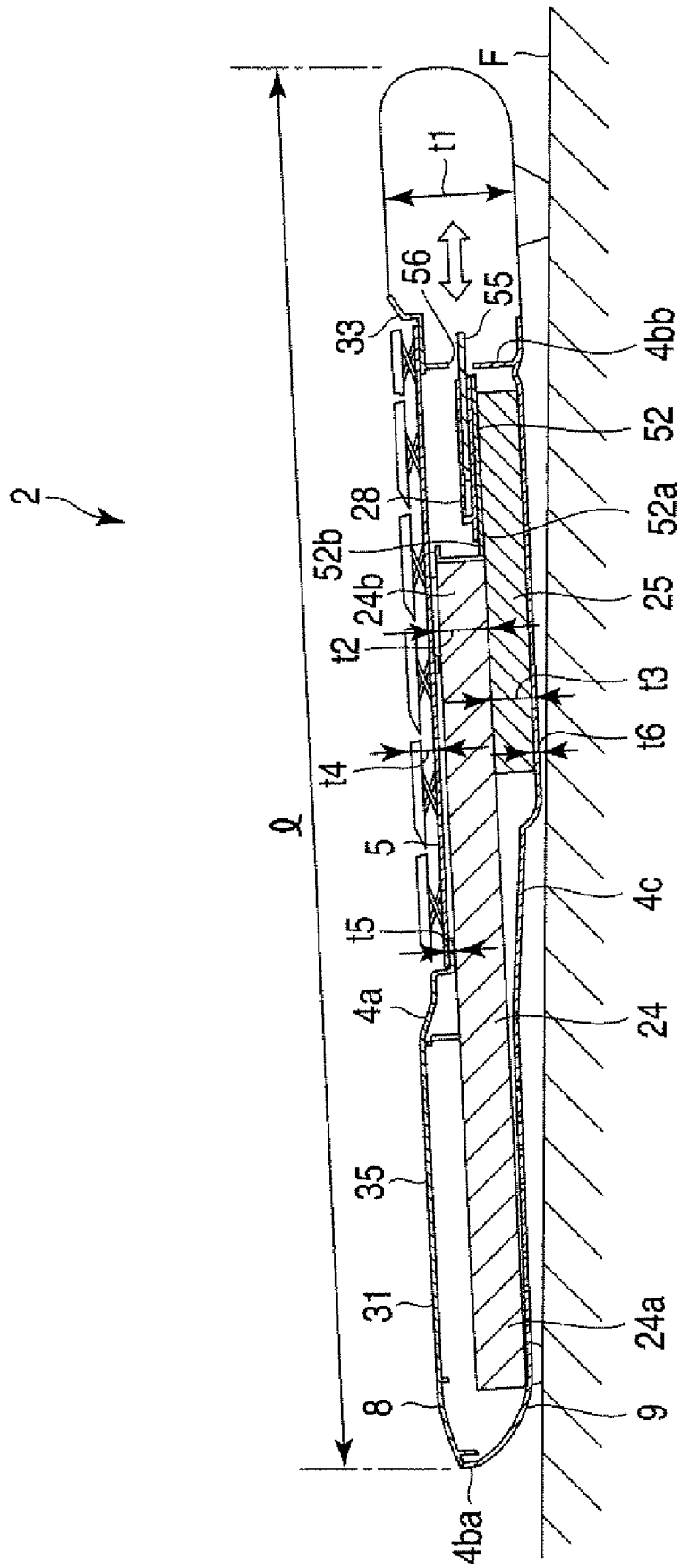
F I G. 5

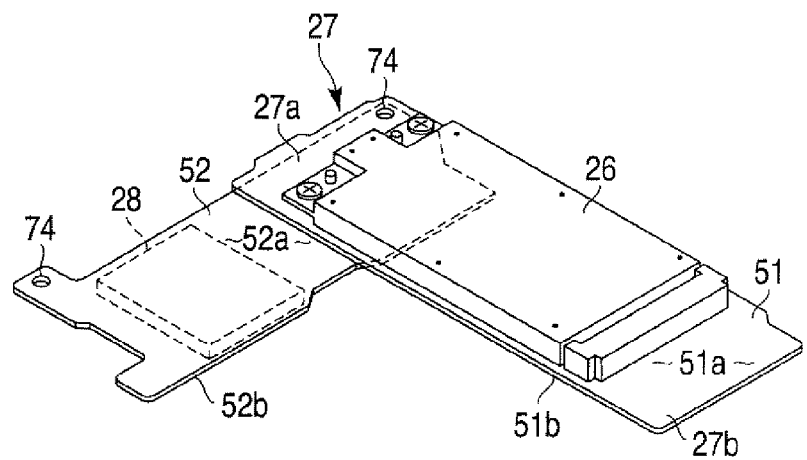
F I G. 7
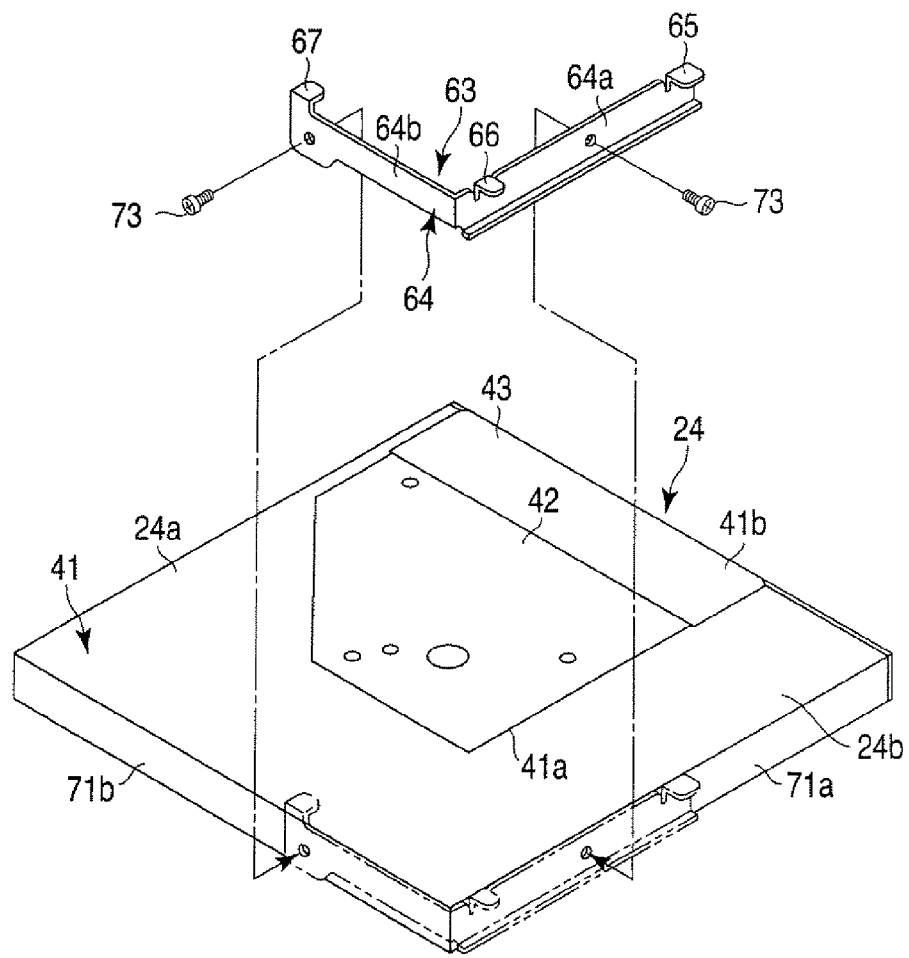
F I G. 8

ELECTRONIC APPARATUS

CROSS-REFERENCE TO RELATED APPLICATIONS

This application is based upon and claims the benefit of priority from Japanese Patent Application No. 2007-272988, filed Oct. 19, 2007, the entire contents of which are incorporated herein by reference.

BACKGROUND

1. Field

One embodiment of the invention relates to an electronic apparatus on which an additional device can be mounted.

2. Description of the Related Art

On an electronic apparatus such as a portable computer, an optical disk drive (ODD) unit and a battery pack serving as a power source are mounted. In Jpn. Pat. Appln. KOKAI Publication No. 9-305261, an electronic apparatus provided with a compact disk read-only memory (CD-ROM) drive, and a battery pack is disclosed. In this electronic apparatus, the CD-ROM drive is mounted adjacent to the battery pack. Here, the CD-ROM drive is suspended in the housing, and the CD-ROM drive and a circuit board are stacked in the vertical direction.

Incidentally, as to the electronic apparatus, there is a great demand for long-time driving, and it is desired that a relatively large battery pack be mounted. Further, as to the electronic apparatus, it is desired that mounting of an additional device such as a PC card slot and a mini-peripheral component interconnect (mini-PCI) module be enabled in addition to the ODD unit and battery pack. On the other hand, with the electronic apparatus, there is a great demand for reduction in the thickness.

Here, as to the relationship between the CD-ROM drive and the circuit board in Jpn. Pat. Appln. KOKAI Publication No. 9-305261, if an ODD unit and an additional device are simply stacked on top of the other in the vertical direction to be mounted, the electronic apparatus tends to become thick.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary perspective view of a portable computer according to an embodiment of the invention;

FIG. 2 is an exemplary plan view showing the inside of a main body of the portable computer shown in FIG. 1;

FIG. 5 is an exemplary cross-sectional view of the portable computer shown in FIG. 3 taken along line F5-F5;

FIG. 7 is an exemplary perspective view showing the mini-PCI module and the circuit board shown in FIG. 3;

FIG. 8 is an exemplary perspective view showing the ODD unit and the bracket shown in FIG. 3;

DETAILED DESCRIPTION

Figure 3:
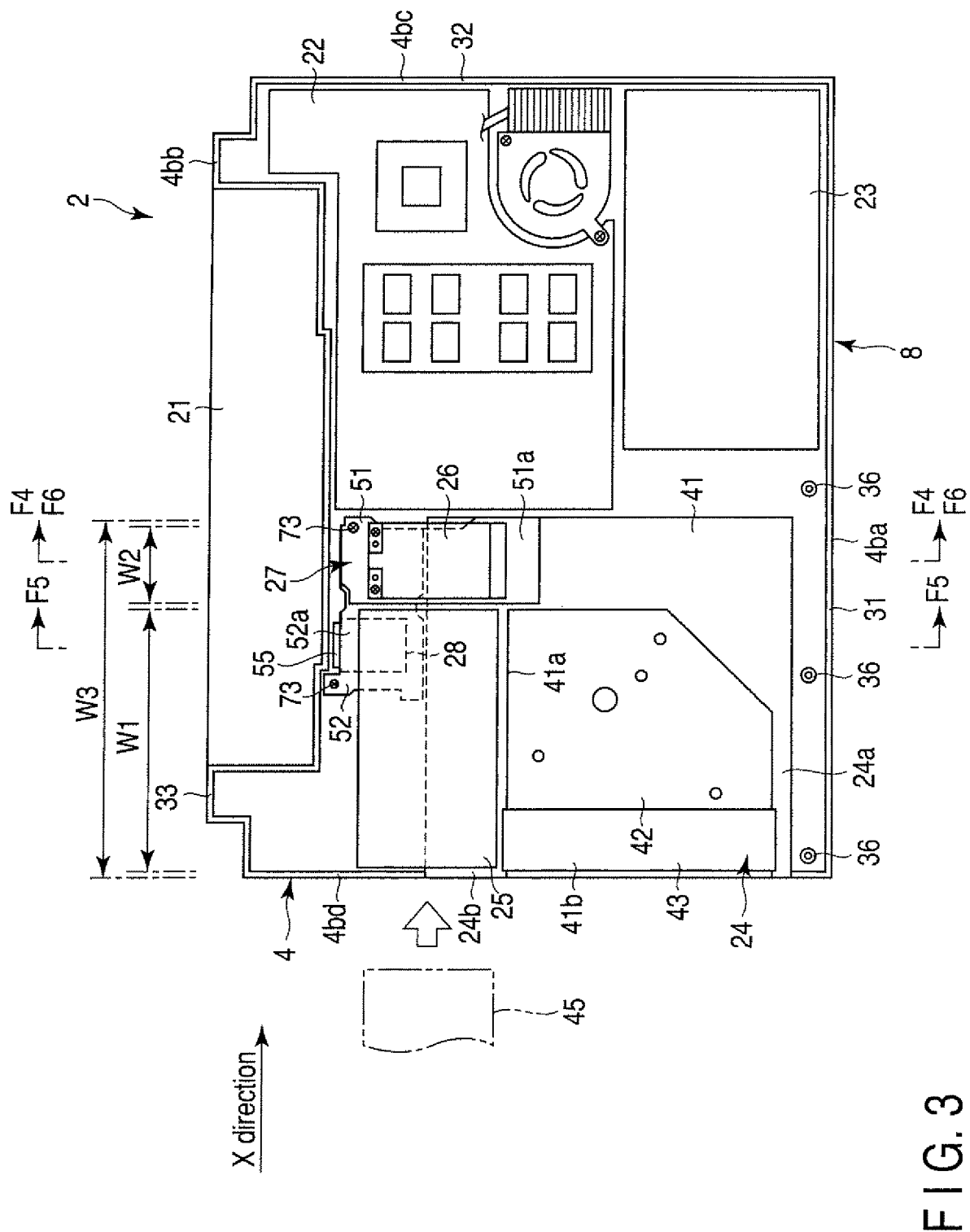
FIG. 3 is an exemplary bottom view showing the inside of the main body of the portable computer shown in FIG. 1.

Various embodiments according to the invention will be described hereinafter with reference to the accompanying drawings. In general, according to one embodiment of the invention, an electronic apparatus comprises a housing, a battery pack mounted on the housing, an ODD unit having a thickness smaller than the battery pack, and contained in the housing, and an additional device contained in the housing. The housing includes a front section which becomes the foremost part of the housing with respect to a user, and a back section which becomes the backmost part of the housing with respect to the user. The battery pack is arranged in the back section of the housing. The ODD unit is arranged to be one-sidedly shifted to the front section in the housing, and includes a front end portion opposed to the front section, and a back end portion opposed to the battery pack. The additional device is away from the front end portion of the ODD unit, and overlaps the back end portion of the ODD unit in the vertical direction.

An example in which an embodiment of the present invention is applied to a portable computer will be described below on the basis of the drawings FIGS. 1 to 10 disclose a portable computer 1 as an electronic apparatus according to an embodiment of the present invention. As shown in FIG. 1, the portable computer 1 includes a main body 2 and a display unit 3.

The main body 2 includes a housing 4. The main body 2 further includes a keyboard 5, and a touch pad 6 serving as a pointing device. The housing 4 includes an upper wall 4a, a peripheral wall 4b, and a lower wall 4c, and is formed into a box-like shape. The upper wall 4a faces upward, and is provided with a keyboard mounting section 7 to which a keyboard 5 is mounted. The lower wall 4c is opposed to an installation surface F on which the portable computer 1 is placed (see FIG. 4). An example of the installation surface is a desktop. The peripheral wall 4b includes a front wall 4ab, a rear wall 4bb, and right and left side walls 4bc and 4bd.

Figure 4:
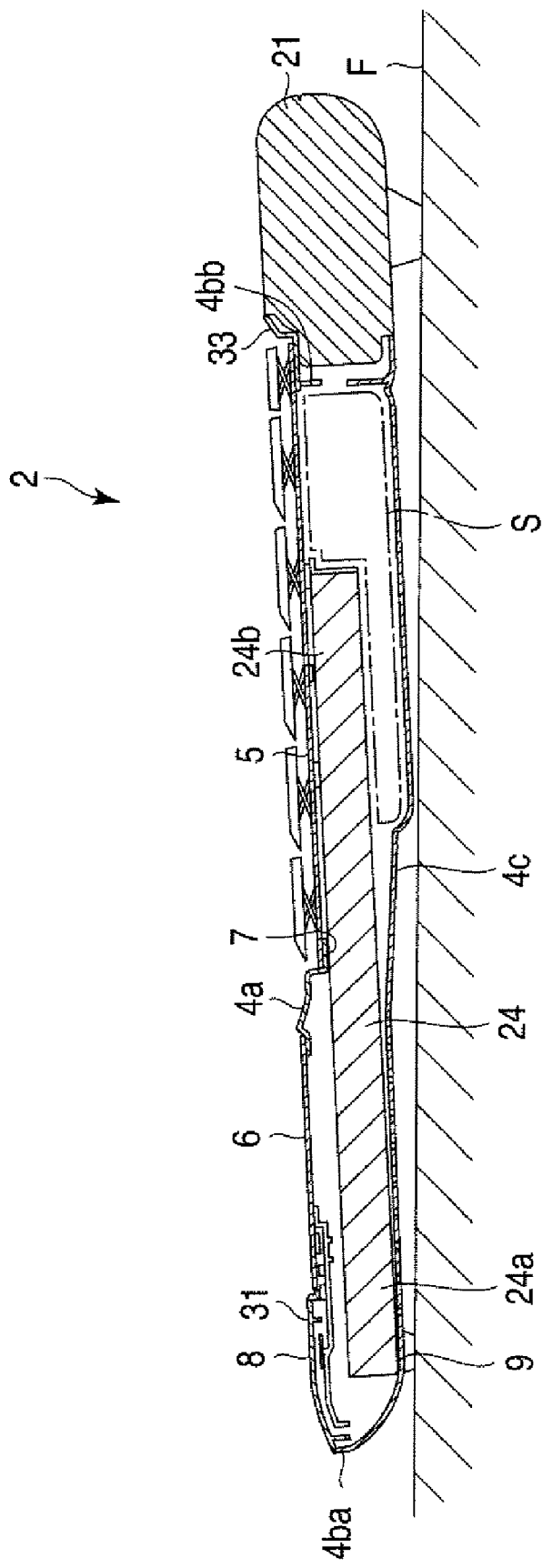
FIG. 4 is an exemplary cross-sectional view of the portable computer shown in FIG. 3 taken along line F4-F4, not showing a card slot and a mini-PCI module.

As shown in FIG. 4, the housing 4 is formed with a housing cover 8 including the upper wall 4a and a part of the peripheral wall 4b, and a housing base 9 including the lower wall 4c and a part of the peripheral wall 4b. The housing cover 8 is detachably combined with the housing base 9, and forms a containing space between the housing cover 8 and the housing base 9. An ODD unit 24, a card slot 25 to be described later, and the like are contained in the containing space.

As shown in FIG. 1, the display unit 3 includes a display housing 11, and a display device 12 contained in the display housing 11. The display device 12 includes a display screen 12a. The display screen 12a is exposed to the outside of the display housing 11 through an opening part 11a in the front of the display housing 11.

The display unit 3 is supported on a back end part of the housing 4 through a pair of hinge sections 13a and 13b. Thus, the display unit 3 is rotatable between a closed position in which the display unit 3 covers the upper wall 4a from above, and an opened position in which the display unit 3 rises to expose the upper wall 4a.

FIG. 2 is a plan view of the main body 2. Incidentally, in FIG. 2, the housing cover 8 is omitted to show the layout inside the housing 4. As shown in FIG. 2, a battery pack 21 serving as a power source is detachably mounted to the housing 4. Further, a main circuit board 22, an HDD unit 23, an ODD unit 24, a card slot 25, a mini-PCI module 26, a circuit board 27, and a card socket 28 are contained in the housing 4.

FIG. 3 is a bottom view in which the main body 2 is viewed from below. Incidentally, in FIG. 3, the housing base 9 is omitted to show the layout inside the housing 4. The layout inside the housing 4 will be described below in detail with reference to FIGS. 3 to 6. Incidentally, FIG. 4 is a view obtained by cutting the portable computer along the same cross section as FIG. 6. However, in FIG. 4, the card slot 25, mini-PCI module 26, circuit board 27, and card socket 28 are omitted for the sake of explanation.

As shown in FIGS. 3 and 4, the housing 4 includes a front section 31, a central section 32, and a back section 33. The front section 31 is provided in the front of the central section 32 with respect to the user. The front section 31 becomes the foremost part of the housing 4 with respect to the user. The back section 33 is provided in the rear of the central section 32 with respect to the user. The back section 33 becomes the backmost part of the housing 4 with respect to the user.

Although the front section 31 and the back section 33 may be variously defined, here, for example, a part to which the keyboard 5 is mounted is defined as the central section 32, a part which is positioned in the front of the keyboard 5, and in which a palm rest 35 and the touch pad 6 are provided is defined as the front section 31, and a part in the rear of the keyboard 5 is defined as the back section 33. Incidentally, in this embodiment, it is defined that with the reference point positioned at the portable computer 1, the part closer to the user is the front, and the part farther from the user is the back.

As shown in FIGS. 3 and 4, the battery pack 21 is arranged in the back section 33 of the housing 4. The battery pack 21 can supply electric power to the portable computer 1 for a relatively long time, and has a relatively large external shape. The portable computer 1 can be operated for, for example, about ten hours by using the battery pack 21 as a power source.

The main circuit board 22, HOD unit 23, and ODD unit 24 are arranged in the housing 4 without overlapping each other in the vertical direction. Each of the main circuit board 22, HDD unit 23, and ODD unit 24 is fixed to the housing cover 8.

As the ODD unit 24, a unit having a smaller thickness than the battery pack 21 is employed. As shown in FIGS. 3 and 4, the ODD unit 24 is arranged to be one-sidedly shifted to the front section 31 in the housing 4. More specifically, as shown in FIG. 3, a boss 36 for fixing the housing cover 8 to the housing base 9 is provided at a front end part of the housing cover 8. The ODD unit 24 is mounted adjacent to a region in which the boss 36 is provided. As shown in FIG. 4, a space is provided between the ODD unit 24 and the battery pack 21.

As shown in FIG. 4, the ODD unit 24 includes a front end portion 24a opposed to the front section 31 of the housing 4, and a back end portion 24b opposed to the battery pack 21. Around the back end portion 24b of the ODD unit 24, a mounting space S is created on the basis of a difference between the ODD unit 24 and the battery pack 21 in thickness. That is, in this embodiment, as shown in FIG. 4, the ODD unit 24 is mounted inclined in such a manner that the front end portion 24a is positioned lower than the back end portion 24b. As a result of this, the mounting space S is created under the back end portion 24b of the ODD unit 24, and between the ODD unit 24 and the battery pack 21.

The ODD unit 24 will next be described, in detail. As shown in FIG. 8, the ODD unit 24 includes a case 41, and a disk tray 42 drawably contained in the case 41. The case 41 includes an opening part 41a and a step part 41b. The opening part 41a is formed in a relatively large region including a central part of the case 41. A part of the disk tray 42 is exposed to the outside of the ODD unit 24 through the opening part 41a.

The step part 41b is a part having a surface externally protuberant as compared with the other part out of the step part 41b. In this embodiment, the step part 41b is formed by a reinforcing plate section 43. The reinforcing plate section 43 is formed into a plate-like shape, and is extended over two edge parts of the opening part 41a. The reinforcing plate section 43 is formed to be outwardly shifted as compared with the other region of the case 41 in order that the section 43 may not hinder, for example, the sliding of the disk tray 42. As a result of this, the surface of the reinforcing plate section 43 has a step outwardly shifted as compared with the surface of the other part of the case 41.

Next, the card slot 25 will be described below. As shown in FIG. 3, the card slot 25 is provided adjacent to the peripheral wall 4b of the housing 4. The peripheral wall 4b is provided with an opening part 44 opposed to the card slot 25 (see FIG. 1). The user inserts or draws out a first card 45 from outside the housing 4 into or from the housing 4 through the opening part 44. The card slot 25 is an example of an additional device mentioned in the present invention. Specific examples of the card slot 25 are a PC card slot, and ExpressCard (trade name) slot.

As shown in FIGS. 3 and 5, the card slot 25 is arranged in such a manner that the slot 25 is away from the front end portion 24a of the ODD unit 24, and overlaps the back end portion 24b of the ODD unit 24 in the vertical direction. The card slot 25 is arranged, for example, under the back end portion 24b of the ODD unit 24. That is, the card slot 25 is arranged in the mounting space S created under the back end portion 24b of the ODD unit 24. As shown in FIG. 5, when the portable computer 1 is placed on the installation surface F, the front end portion 24a of the ODD unit 24 is positioned at the same height as the card slot 25. Incidentally, "positioned at the same height" implies that the two members partly overlap each other in the horizontal direction.

The mini-PC module 26 is an example of the additional device mentioned in the present invention, and is an example of an expansion module. Specific examples of the mini-PCI module 26 are a 3rd generation (3G) module, TV tuner, GPS module, Wimax (trade name) module, and the like.

Figure 6:
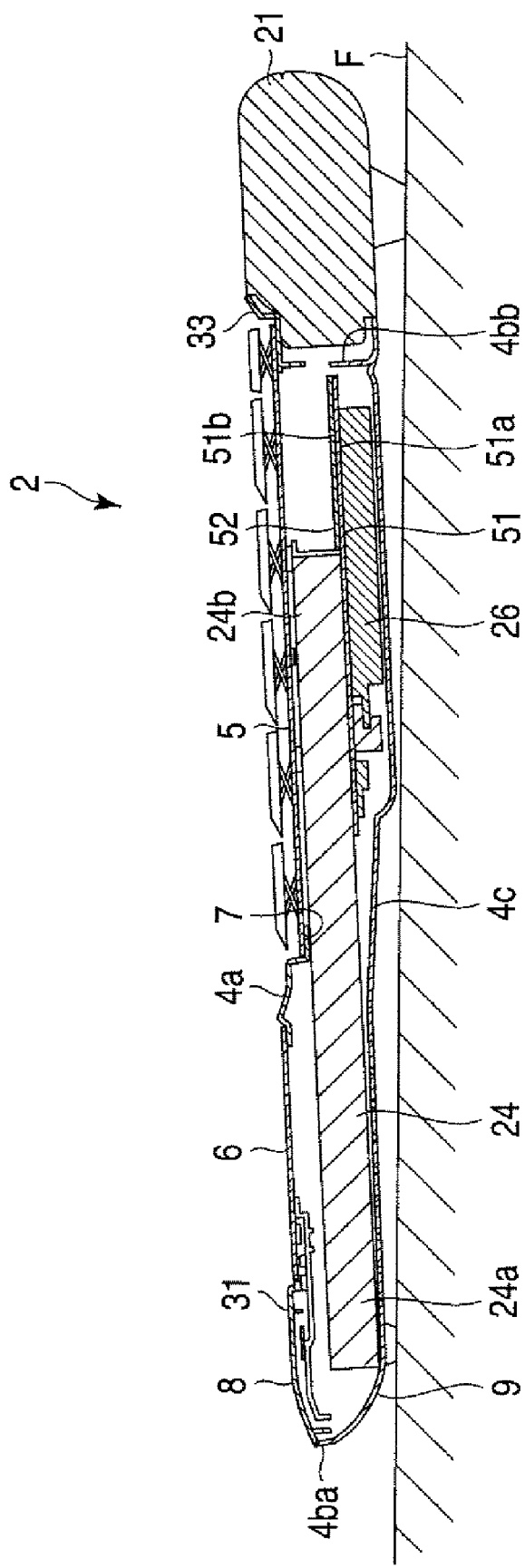
FIG. 6 is an exemplary cross-sectional view of the portable computer shown in FIG. 3 taken along line F6-F6.

As shown in FIGS. 3 and 6, the mini-PCI module 26 is arranged in such a manner that the module 26 is away from the front end portion 24a of the ODD unit 24, and overlaps the back end portion 24b of the ODD unit 24 in the vertical direction. The mini-PCI module 26 is arranged, for example, under the back end portion 24b of the ODD unit 24. That is, the mini-PCI module 26 is arranged in the mounting space S created under the back end portion 24b of the ODD unit 24. As shown in FIG. 6, when the portable computer 1 is placed on the installation surface F, the front end portion 24a of the ODD unit 24 is positioned at the same height as the mini-PCI module 26.

As shown in FIG. 3, the mini-PCI module 26 is arranged side by side with the card slot 25 in a predetermined direction (hereinafter referred to as the X direction) perpendicular to the direction from the front section 31 of the housing 4 to the back section 33. The mini-PCI module 26 is an example of a component which the user does not directly access. The mini-PCI module 26 is provided at a more inward position of the housing 4 than the card slot 25.

As shown in FIG. 3, the card slot 25 and the mini-PCI module 26 are arranged in a region away from the opening part 41a and the step part 41b of the case 41 of the ODD unit 24.

As shown in 3, a total of a width W1 of the card slot 25 in the X direction, and a width W2 of the mini-PCI module 26 in the X direction is smaller than a width W3 of the ODD unit 24 in the X direction. That is, as to the X direction, the card slot 25, and the mini-PCI module 26 are arranged in the area of the ODD unit 24. Incidentally, "in the area of the ODD unit 24" implies a region in which the ODD unit 24 is overlapped in the vertical direction.

By having the configuration described above, the housing 4 is formed in such a manner that the thickness of the back section 33 coincides with the thickness of the battery pack 21, and the thickness of the housing 4 at a position thereof becomes smaller as the position moves from the back section 33 to the front section 31. The keyboard 5 is mounted in parallel with the ODD unit 24.

Here, an example of the dimension of each unit will be described below. The length l of the housing 4 from the front end part to the back end part is about 215 mm, the thickness t1 of the battery pack 21 is about 20 mm, the thickness t2 of the ODD unit 24 is about 7 mm, the thickness t3 of the card slot 25 is about 5 mm, the thickness t4 of the keyboard 5 is about 5 mm, the thickness t5 of the housing cover 8 is about 1 mm, and the thickness t6 of the housing base 9 is about 1 mm.

Next, a mounting structure of the mini-PCI module 26 will be described below in detail with reference to FIGS. 7 to 10. As shown in FIG. 7, the portable computer 1 includes a circuit board 27 on which the mini-PCI module 26 is mounted separately from the main circuit board 22. The circuit board 27 includes, for example, a first board section 51 and a second board section 52 which are integral with each other. The first and second board sections 51 and 52 are each formed into a rectangular shape, and are stuck together with the longitudinal directions of the board sections intersecting each other at right angles.

Figure 9:
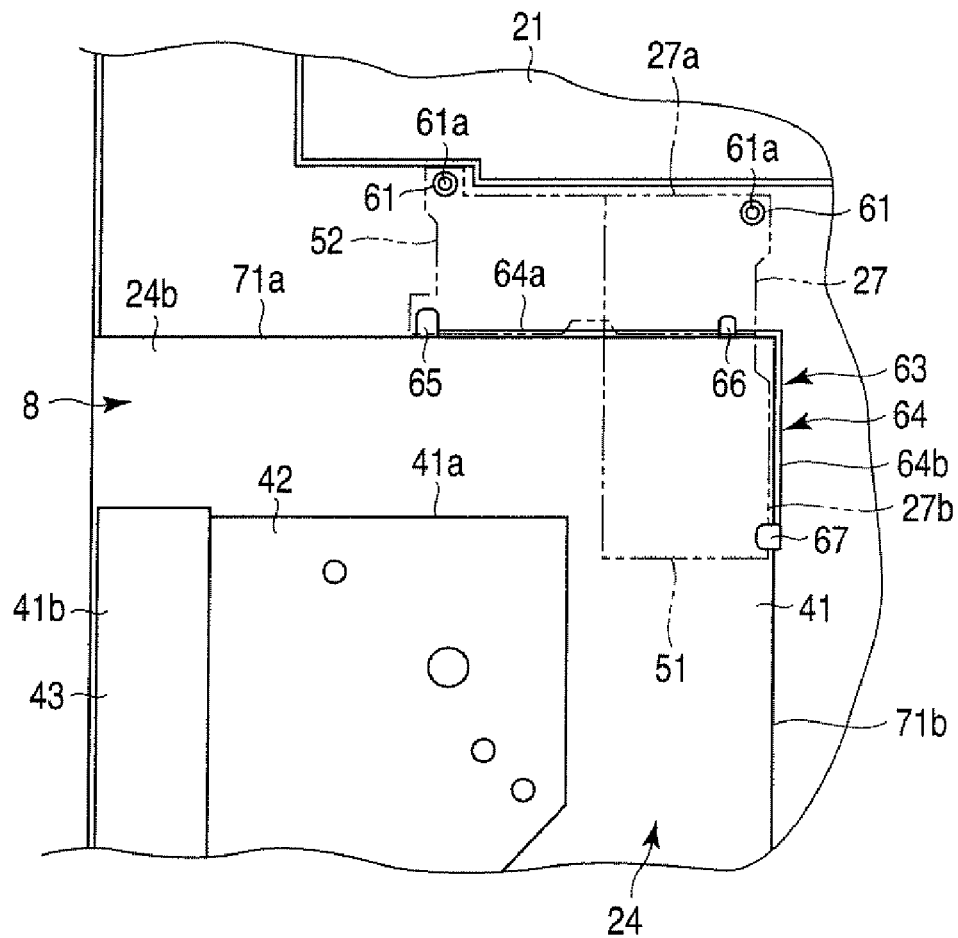
FIG. 9 is an exemplary bottom view showing the inside of the main body shown in FIG. 3.
Figure 10:
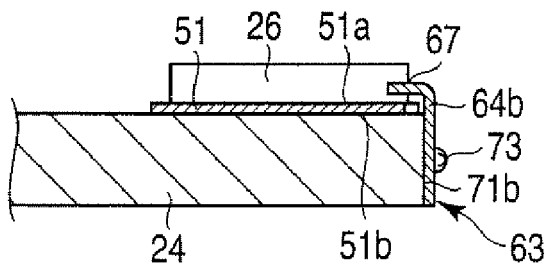
FIG. 10 is an exemplary cross-sectional view of the ODD unit and the bracket shown in FIG. 8.

The first board section 51 has a width slightly larger than that of the mini-PCI module 26, and has a length larger than that of the mini-PCI module 26. The first board section 51 includes a first surface 51a facing the lower part of the portable computer 1, and a second surface 51b opposite to the first surface 51a. The mini-PCI module 26 is mounted on the first surface 51a of the first board section 51. As shown in FIGS. 3 and 9, the first board section 51 is opposed to the back end portion 24b of the ODD unit 24, and is opposed to the space formed between the ODD unit 24 and the battery pack 21.

As shown in FIG. 7, the second board section 52 is laid on the second surface 51b of the first board section 51. As shown in FIG. 9, the second board section 52 has a shape that is capable of being fitted in the space between the ODD unit 24 and the battery pack 21. The second board section 52 is contained in the space between the ODD unit 24 and the battery pack 21, and is opposed to the ODD unit 24 in the horizontal direction.

As shown in FIGS. 2 and 5, the second board section 52 includes a first surface 52a opposed to the first board section 51, and a second surface 52b opposite to the first surface 52a. On the second surface 52b, for example, one card socket 28 or a plurality of card sockets 28 are mounted. The card socket 28 is a relatively small socket contained in the space between the ODD unit 24 and the battery pack 21, and a specific example thereof is a subscriber identity module (SIM) socket. A second card 55 is detachably inserted into the card socket 28. An example of the second card 55 is a SIM card.

As shown in FIG. 5, the rear wall 4bb of the housing 4 opposed to the battery pack 21 includes an opening part 56 opposed to the card socket 28. When the battery pack 21 is detached from the housing 4, an insertion opening of the card socket 28 is exposed to the outside of the housing 4 through the opening part 56. The user can insert or draw out the second card 55 into or from the card socket 28 only when the battery pack 21 is detached from the housing 4.

As shown in FIG. 9, the housing cover 8 includes a plurality of bosses 61 provided in a region away from the ODD unit 24, for example, a region between the ODD unit 24 and the battery pack 21. Each of the bosses 61 is provided on the inner wall surface of the housing 4 to rise therefrom inside the housing, and a threaded hole 61 opened to the inside of the housing 4 is formed therein.

As shown in FIG. 8, a bracket 63 is attached to the ODD unit 24. The bracket 63 includes a main body section 64, first and second support sections 65 and 66, and a hang-up section 67. The main body section 64 includes a first section 64a and a second section 64b which are combined with each other so that the sections 64a and 64b intersect at right angles, thus main body section 64 is formed into an L-shape.

The case 41 of the ODD unit 24 includes a first side surface 71a opposed to the battery pack 21, and a second side surface 71b adjacent to the first side surface 71a, and facing the inside of the housing 4. The first section 64a of the bracket 63 extends along the first side surface 71a of the ODD unit 24, and is fixed to the first side surface 71a by, for example, a screw 73. The second section 64b of the bracket 63 extends along the second side surface 71b of the ODD unit 24, and is fixed to the second side surface 71b by, for example, a screw 73.

The first and second support sections 65 and 66 are provided on the first section 64a separately from each other. The first and second support sections 65 and 66 are projection sections each projecting from the lower end part of the first section 64a toward the battery pack 21, and are opposed to the second board section 52 of the circuit board 27.

As shown in FIGS. 7 and 9, the circuit board 27 includes a first end portion 27a opposed to the bosses 61, and a second end portion 27b opposed to the ODD unit 24. The first end portion 27a is provided with screw insertion holes 74 opposed to the threaded holes 61a of the bosses 61. Fixation of the circuit board 27 is performed by engaging screws 73 inserted into the screw insertion holes 74 with the threaded holes 61a of the bosses 61. That is, the circuit board 27 is fixed to the bosses 61 provided on the housing cover 8 without being fixed to the ODD unit 24. At this time, the end portion of the second board section opposite to the screw-fixed end portion is brought into contact with the first and second support sections 65 and 66 of the bracket 63, and is supported by the first and second support sections 65 and 66.

The hang-up section 67 extends from the lower end part of the second section 64b, and extends toward a position below (i.e., above in FIG. 10) the circuit board 27 fixed to the bosses 61. The hang-up section 67 is opposed to the second end portion 27b of the circuit board 27 from the opposite side of the ODD unit 24.

According to the portable computer 1 configured as described above, it is possible to mount an additional device, and realize reduction in thickness and long-time driving. That is, in the portable computer 1, the battery pack 21 is arranged in the back section 33 of the housing 4, the ODD unit 24 having a thickness smaller than the battery pack 21 is arranged closer to the front section 31, and the additional devices such as the card slot 25 and mini-PCI module 26 are arranged at the back end portion 24b of the ODD unit 24 in a vertically overlapping manner.

As a result of this, it is possible to form the housing 4 in such a manner that the thickness of the back section 33 of the housing 4 coincides with the thickness of the battery pack 21, and the thickness of the housing 4 decreases from the back section 33 to the front section 31. As a result of this, it is possible to obtain a portable computer 1 to which additional devices can be mounted, and which enables long-time driving by using a relatively large-sized battery pack, and reduction in the thickness of the housing 4.

In this embodiment, the mini-PCI module 26 as an expansion module is away from the front end portion 24a of the ODD unit 24 and overlaps the back end portion 24b of the ODD unit 24 in the vertical direction, is arranged side by side with the card slot 25 in the X direction, and is arranged at a more inward position of the housing 4 than the card slot 25.

According to such a configuration, it is possible to provide the card slot 25, which is accessed by the user, adjacent to the peripheral wall 4b of the housing 4, and prevent the housing 4 from becoming thick even when the card slot 25 and the mini-PCI module 26 are incorporated therein.

The card slot 25 is arranged under the back end portion 24b of the ODD unit 24, and the ODD unit 24 is mounted inclined in such a manner that the front end portion 24a is positioned lower than the back end portion 24b. When the portable computer 1 is placed on the installation surface F, by positioning the front end portion 24a at the same height as the card slot 25, the height of the front section 31 of the housing from the installation surface F can be made small. As a result of this, when the portable computer 1 is placed on the installation surface F, the housing 4 assumes a forward-tilted posture, and hence the portable computer 1 appears to be thinner.

When the total of the width W1 of the card slot 25 in the X direction, and the width W2 of the mini-PCI module 26 in the X direction is smaller than the width W3 of the ODD unit 24 in the X direction, the card slot 25, and the mini-PCI module 26 can be arranged in the area of the ODD unit 24. As a result of this, it is possible to reduce the influence of the card slot 25 and the mini-PCI module 26 on the mounting structure of the other units such as the main circuit board 22 and the like, and further advance the reduction in thickness.

When the circuit board 27 is fixed to the bosses 61 provided in the housing 4 without being fixed to the ODD unit 24, it is not necessary to provide the ODD unit 24 with a fixing section. As a result of this, it is possible to employ a unit of a further reduced thickness as the ODD unit 24. This contributes to reduction in the thickness of the portable computer 1.

When the ODD unit 24 is fixed to the housing cover 8, and the bosses 61 are provided on the housing cover 8, after the ODD unit 24 is mounted, the circuit board 27 can be mounted with the housing 4 in the same posture without changing the posture of the housing 4. This makes it possible to improve the facility of the assembling work of portable computer 1. Furthermore, fixation of the circuit board 27 becomes firmer than the case where the circuit board 27 is fixed to the main circuit board 22.

In the case where the circuit board 27 includes the first end portion 27a opposed to the bosses 61, and the second end portion 27b opposed to the ODD unit 24, and the bracket includes the hang-up section 67 opposed to the second end part 27b of the circuit board 27 from the opposite side of the ODD unit 24, it is possible to prevent the circuit board 27 fixed at only one end portion 27a from floating.

In the case where the card socket 28 is provided between the ODD unit 24 and the battery pack 21, the housing 4 can be made thinner than in the case where, for example, the card socket 28 is arranged to overlap the battery pack 21.

When the battery pack 21 is detached from the housing 4, the card socket 28 is exposed to the outside of the housing 4. In order to insert or draw out the second card 55 into or from the card socket 28, it becomes necessary to detach the battery pack 21. As a result of this, for example, when the card socket 28 is hot-swappable, the security of the data written to the second card 55 can be enhanced.

In the case where the card slot 25 and the mini-PCI module 26 are arranged in a region away from the opening part 41a of the ODD unit 24, dust cannot enter the interior of the case 41 from the opening part 41a. In the case where the card slot 25 and the mini-PCI module 26 are arranged in a region away from the step part 41b of the ODD unit 24, the reduction in the thickness of the housing 4 can be further advanced.

The portable computer 1 according to the embodiment of the present invention has been described above. However, the present invention is not limited to this. For example, the card socket 28 is not limited to the SIM socket, and may be a socket compatible with a card of any other type.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing including a front section and a back section;
    a battery pack attached to the housing and situated in the back section of the housing;
    an optical disk drive unit placed in the housing and having a thickness smaller than the battery pack, the optical disk drive unit including a front end portion opposed to the front section of the housing and a back end portion opposed to the battery pack, the optical disk drive unit oriented at an incline from the front end portion to the back end portion due to a difference in thickness between the optical disk drive unit and the battery pack; and
    an additional device in the housing, the additional device being situated away from the front end portion of the optical disk drive unit and overlapping the back end portion of the optical disk drive unit.

2. The electronic apparatus according to claim 1, wherein a thickness of the housing decreases from the back section to the front section due to a difference between a thickness of the front end portion of the optical disk drive unit and a total of thicknesses of the additional device and the back end portion of the optical disk drive unit.

3. The electronic apparatus according to claim 1, wherein the additional device is a mini-PCI module.

4. The electronic apparatus according to claim 1, wherein the additional device is a wireless communication module.

5. The electronic apparatus according to claim 1, wherein the additional device is a television tuner.

6. The electronic apparatus according to claim 1, wherein the additional device is a global satellite positioning (GPS) module.

7. An electronic apparatus comprising:
    a housing including a front section and a back section;

a battery pack attached to the housing, the battery pack being positioned in the back section of the housing;

an optical disk drive unit placed in the housing and having a thickness smaller than the battery pack, the optical disk drive unit including a front end portion opposed to the front section and a back end portion opposed to the battery pack and is oriented at an incline from the front end portion of the back end portion due to a difference in thickness between the optical disk drive unit and the battery pack;

a card slot in the housing; and an expansion module in the housing, wherein the card slot and the expansion module are positioned away from the front end portion of the optical disk drive unit, and overlap the back end portion of the optical disk drive unit.

8. The electronic apparatus according to claim 7, wherein a thickness of the housing decreases from the back section to the front section due to a difference between a thickness of the front end portion of the optical disk drive unit and a total of thicknesses of the card slot and the back end portion of the optical disk drive unit.

9. The electronic apparatus according to claim 7, wherein the housing comprises an upper wall, and the card slot and the expansion module are aligned in a second direction perpendicular to a first direction connecting the front section and the back section, the first direction and second direction defining the upper wall.

10. The electronic apparatus according to claim 9, wherein the expansion module is located more inward of the housing than the card slot.

11. The electronic apparatus according to claim 9, wherein a total of a width of the card slot and a width of the expansion module in the second direction is smaller than a width of the optical disk drive unit in the second direction.

12. The electronic apparatus according to claim 7, wherein the card slot is arranged under the back end portion of the optical disk drive unit, and the front end portion of the optical disk drive unit is positioned at the substantially same height as the card slot, when the electronic apparatus is placed on an installation surface.

13. The electronic apparatus according to claim 7, further comprising a circuit board on which the expansion module is mounted, wherein the housing includes a boss provided in a region away from the optical disk drive unit, and the circuit board is fixed to the boss without being fixed to the optical disk drive unit.

14. The electronic apparatus according to claim 13, further comprising a keyboard mounted on the housing, wherein the housing includes a housing base opposed to an installation surface, and a housing cover which combines with the housing base and on which the keyboard is mounted, the optical disk drive unit is fixed to the housing cover, and the boss is provided on the housing cover, and the circuit board is fixed to the housing cover.

15. The electronic apparatus according to claim 13, further comprising a bracket attached to the optical disk drive unit, wherein the circuit board includes a first end portion opposed to the boss, and a second end portion opposed to the optical disk drive unit, and the bracket includes a hang-up section opposed to the second end portion of the circuit board from the opposite side of the optical disk drive unit.

16. The electronic apparatus according to claim 7, further comprising a card socket between the optical disk drive unit and the battery pack.

17. The electronic apparatus according to claim 16, wherein the battery pack detachably attached to the housing, and the card socket is exposed to the outside of the housing when the battery pack is detached from the housing.

18. The electronic apparatus according to claim 7, wherein the optical disk drive unit includes a case including an opening part, and a disk tray moveably contained in the case, and the card slot and the expansion module are arranged in a region away from the opening part of the case.

19. The electronic apparatus according to claim 4, wherein the expansion module including circuitry that supports wireless communications.

20. The electronic apparatus according to claim 7, wherein the expansion module including a television tuner.

* * * * *